US011596218B2

(12) United States Patent
Evans

(10) Patent No.: US 11,596,218 B2
(45) Date of Patent: Mar. 7, 2023

(54) WEARABLE DRINKING DEVICE

(71) Applicant: Bryce Evans, Greenville, TN (US)

(72) Inventor: Bryce Evans, Greenville, TN (US)

( * ) Notice: Subject to any disclaimer, the term of this patent is extended or adjusted under 35 U.S.C. 154(b) by 0 days.

(21) Appl. No.: 17/372,011

(22) Filed: Jul. 9, 2021

(65) Prior Publication Data

US 2022/0007821 A1 Jan. 13, 2022

Related U.S. Application Data

(60) Provisional application No. 63/005,186, filed on Jul. 9, 2020.

(51) Int. Cl.
*A45F 5/00* (2006.01)
*G02C 11/00* (2006.01)

(52) U.S. Cl.
CPC ........ *A45F 5/00* (2013.01); *A45F 2200/0583* (2013.01); *B67D 2210/00131* (2013.01)

(58) Field of Classification Search
CPC . A45F 2200/0583; G02C 11/00; G02C 11/02; B67D 2210/00131
USPC ............................................ 224/148.1–148.7
See application file for complete search history.

(56) References Cited

U.S. PATENT DOCUMENTS

| | | | | | |
|---|---|---|---|---|---|
| 1,851,579 | A * | 3/1932 | Hixon | G02B 25/004 | 2/442 |
| 3,446,209 | A * | 5/1969 | Macha | A61F 9/0026 | 351/158 |
| D218,350 | S * | 8/1970 | Marks | D7/534 | |
| 4,364,645 | A * | 12/1982 | Feinbloom | A61B 3/04 | 351/158 |
| 4,468,103 | A * | 8/1984 | Meckler | G02C 11/00 | 351/158 |
| 4,498,743 | A * | 2/1985 | Feinbloom | G02C 11/00 | 351/45 |
| 4,834,525 | A * | 5/1989 | Vansaghi | G02B 25/004 | 351/158 |
| 5,007,727 | A | 4/1991 | Kahaney et al. | | |

(Continued)

OTHER PUBLICATIONS

Set of 2 Funny Shot Glasses 2 oz for Men Best for Laughs—Glass Shot Glasses with a Quirky Style Frame for Any Occasion—The Best for Laughs Accessory, Amazon, (online), (7 pages), [Retrieved from the Internet Sep. 21, 2021] <https://www.amazon.com/Funny-Shot-Glasses-Best-Laughs/dp/B08NYX8KPS/ref=sr_1_70_sspa?dchild=1&keywords=funny+shot+glasses+glasses&qid=1623237605&sr=8-70-spons&psc=1&smid=AN2433OMQOLYL&spLa=ZW5jcnlwdGVkUXVhbGlmaWVyPUEyU1pZUTdZNkdNM0ZHJmVuY3J5cHRlZElkPUEwMzc5MTY0SERYNlRZVFA0S0dIJmVuY3J5cHRlZEFkSWQ9QTA1Mjk2MTgyN1gwU1NGOE1XRENWJndpZGdldE5hbWU9c3BfbXRmJmFjdGlvbj1jbGlja1JlZGlyZWN0JmRvTm90TG9nQ2xpY2s9dHJ1ZQ==>.

*Primary Examiner* — Justin M Larson
(74) *Attorney, Agent, or Firm* — Alston & Bird LLP

(57) ABSTRACT

Various embodiments of the present invention are directed to a wearable drinking device and a method of using the same. In embodiments, the wearable drinking device comprises at least one retaining member; a frame member; and two arms. The at least one retaining member is configured for being secured to the at least one retaining member. In embodiments, the wearable drinking device comprise at least one cap detachably secured to the at least one retaining member. In embodiments, a method of using the wearable drinking device comprise providing a wearable drinking device comprising at least one retaining member, at least one cap and a frame member; filling the at least one retaining member with a liquid; securing the at least one cap to the at least one retaining member; securing the at least one retaining member to the frame member; and positioning the frame member on a user's face.

19 Claims, 17 Drawing Sheets

(56) References Cited

U.S. PATENT DOCUMENTS

| | | | | | |
|---|---|---|---|---|---|
| 5,595,325 | A * | 1/1997 | Leres | B67D 3/041 | 222/383.3 |
| 5,732,862 | A * | 3/1998 | Bull | A61C 19/006 | 433/163 |
| 6,045,017 | A * | 4/2000 | Connell | A47G 23/0225 | 224/675 |
| D436,119 | S | 1/2001 | Bolle | | |
| 6,568,805 | B1 | 5/2003 | Dietz | | |
| 6,604,648 | B2 * | 8/2003 | Immerman | A47G 19/2261 | 220/636 |
| 6,667,833 | B1 * | 12/2003 | Fay | G02C 7/088 | 351/158 |
| 8,157,663 | B1 * | 4/2012 | Winkelsas | G02C 7/16 | 351/158 |
| 8,272,506 | B1 | 9/2012 | Flannery et al. | | |
| 9,010,759 | B2 * | 4/2015 | McDonnell | A63F 9/00 | 273/342 |
| 2005/0127120 | A1 * | 6/2005 | Pablo | A45F 5/00 | 224/605 |
| 2005/0167289 | A1 * | 8/2005 | Borg | B65D 23/104 | 294/87.2 |
| 2006/0201968 | A1 * | 9/2006 | Degroff | A45F 5/021 | 222/131 |
| 2011/0017787 | A1 * | 1/2011 | Burlage | A45F 3/14 | 224/148.1 |
| 2016/0228292 | A1 * | 8/2016 | Michalos | A61F 9/0026 | |
| 2020/0345163 | A1 * | 11/2020 | O'Hanlon | A47G 19/23 | |
| 2021/0163199 | A1 * | 6/2021 | Rattanapaibooncharoen | A47G 23/0208 | |

* cited by examiner

FIG. 3

WEARABLE DRINKING DEVICE

CROSS REFERENCE TO RELATED APPLICATIONS

This application claims priority to and the benefit of the U.S. Provisional Patent Application Ser. No. 63/005,186, filed Jul. 9, 2020; the contents of which as are hereby incorporated by reference in their entirety.

TECHNOLOGICAL FIELD

The present disclosure relates to drinking device and in certain embodiments, to a wearable drinking device configured to be worn on the face of the user.

BACKGROUND

Drinking devices are essential for holding liquid substances and facilitating consumption of the same. Historically, drinking devices, particularly of the shot glass type, are generally small, conical-shaped, and flat-bottomed glasses. Various attempts have been made over the years to facilitate portability (e.g., for transport from location to location) of these devices by users thereof. For example, certain devices have incorporated hooks for hanging them from larger beverage glasses or the like. Such attempts, however, have impeded usefulness of certain devices; no novelty, in terms of uniqueness for conversation pieces or the like, exists with these devices. Moreover, eyeglasses are generally known to be used for therapeutic purposes (e.g., prescription glasses to correct vision problems) and non-therapeutic purposes (e.g., sunglasses, safety glasses, and the like). Thus, a need exists for a drinking device that is not only easily transportable, but also entertaining, incorporating of a new utility for eyeglasses and/or eyeglasses-like frames, and conversation-starting, for example, at a party or social event location.

BRIEF SUMMARY

Various embodiments of the present invention are directed to a wearable drinking device. According to various embodiments, the wearable drinking device comprises: at least one retaining member comprising a bottom end; and a hollow body extending from the bottom end and having an upper portion and a lower portion, wherein the bottom end and the hollow body define an interior space; at least one cap configured to be detachably secured to the upper portion of the hollow body of the at least one retaining member; a frame member, wherein the frame member comprise a first frame portion defining a first opening; and a second frame portion defining a second opening; wherein the at least one retaining member is configured for being secured to at least one of the first frame portion or the second frame portion; a first arm secured to the first frame portion; and a second arm secured to the second frame portion.

In various embodiments, at least a portion of the at least one retaining member and/or at least a portion of the at least one cap may be substantially transparent. In various embodiments, the at least one retaining member may be substantially cylindrical. In various embodiments, the at least one retaining member may be substantially conical. In various embodiments, at least one of the first arm and/or the second arm comprises a curved portion. In various embodiments, the at least one retaining member is fixedly secured to at least one of the first frame portion or the second frame portion. In various embodiments, the at least one retaining member is detachably secured to at least one of the first frame portion or the second frame portion.

In various embodiments, the first frame portion and the second frame portion are spaced apart relative to one another. In various embodiments, the at least one retaining member is made from a glass material. In various embodiments, the at least one retaining member is made from a plastic material. In various embodiments, the lower portion of the hollow body is proximate to the frame member when the at least one retaining member is secured to at least one of the first frame portion or the second frame portion. In various embodiments, the at least one retaining member is secured to at least one of the first frame portion or the second frame portion utilizing a friction-type fit.

In various embodiments, the lower portion of the hollow body of the at least one retaining member comprises a thread extending along at least a portion of an exterior perimeter of the lower portion configured for mating with a corresponding thread extending along an interior perimeter of at least one of the first opening of the first frame portion or the second opening of the second frame portion. In various embodiments, the lower portion of the hollow body of the at least one retaining member comprises one or more connecting pieces extending from an exterior perimeter of the lower portion of the hollow body configured for securing the at least one retaining member to at least one of the first frame portion or the second frame portion. In various embodiments, an interior perimeter of the first opening defined by the first frame portion comprises one or more slots configured for receiving the one or more connecting pieces extending from the exterior perimeter of the lower portion of the hollow body. In various embodiments, the at least one cap comprises a thread extending along at least a portion of an interior perimeter of the at least one cap configured for mating with a corresponding thread extending along an exterior perimeter of the upper portion of the hollow body of the at least one retaining member.

According to some embodiments, the wearable drinking device comprises: at least one retaining member, comprising a bottom end; and a hollow body extending from the bottom end and having an upper portion and a lower portion, wherein the bottom end and the hollow body define an interior space; a frame member, wherein the frame member comprises a first frame portion defining a first opening; and a second frame portion defining a second opening; wherein the at least one retaining member is configured for being secured to at least one of the first frame portion or the second frame portion; a first arm secured to the first frame portion; and a second arm secured to the second frame portion.

According to various embodiments a method of using a wearable drinking device, comprises the steps of: providing a wearable drinking device comprising at least one retaining member comprising a bottom end; and a hollow body extending from the bottom end and having an upper portion and a lower portion, wherein the bottom end and the hollow body define an interior space; at least one cap configured to be detachably secured to the upper portion of the hollow body of the at least one retaining member; a frame member comprising a first frame portion defining a first opening and a second frame portion defining a second opening; wherein the at least one retaining member is configured for being secured to at least one of: (i) the first frame portion or (ii) the second frame portion; filling the interior space of the at least one retaining member with a liquid; securing the at least one cap to the at least one retaining member; securing the lower portion of the at least one retaining member to the frame member; and positioning the frame member on a user's face.

BRIEF DESCRIPTION OF THE DRAWINGS

Reference will now be made to the accompanying drawings which are not necessarily drawn to scale, and wherein.

DETAILED DESCRIPTION

Various embodiments of the present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The term "or" is used herein in both the alternative and conjunctive sense, unless otherwise indicated. The terms "illustrative," "example," and "exemplary" are used to be examples with no indication of quality level. The term "approximately" refers to within engineering and/or manufacturing limits. Like numbers refer to like elements throughout.

Various embodiments of the present invention are directed to a wearable drinking device. According to various embodiments, the wearable drinking device may be configured for being worn on the face of a user and may include a frame member coupled to a pair of arms and at least one retaining member. As described in greater detail herein, the frame member may include a pair of frame portions, where at least one of the pair of frame portions is configured for receiving the at least one retaining member (e.g., a shot glass or the like). The at least one retaining member is generally configured for holding liquid and/or other substances. At least a portion of the retaining member is substantially transparent and/or translucent. The pair of frame portions are generally spaced apart relative to one another and may include a bridge therebetween for supporting the frame member on the nose of the user. The pair of arms are generally positioned on opposing ends of the frame member and configured for being placed over the ears of a user to further support the frame member on the face of the user.

I. WEARABLE DRINKING DEVICE 10

Figure 1:
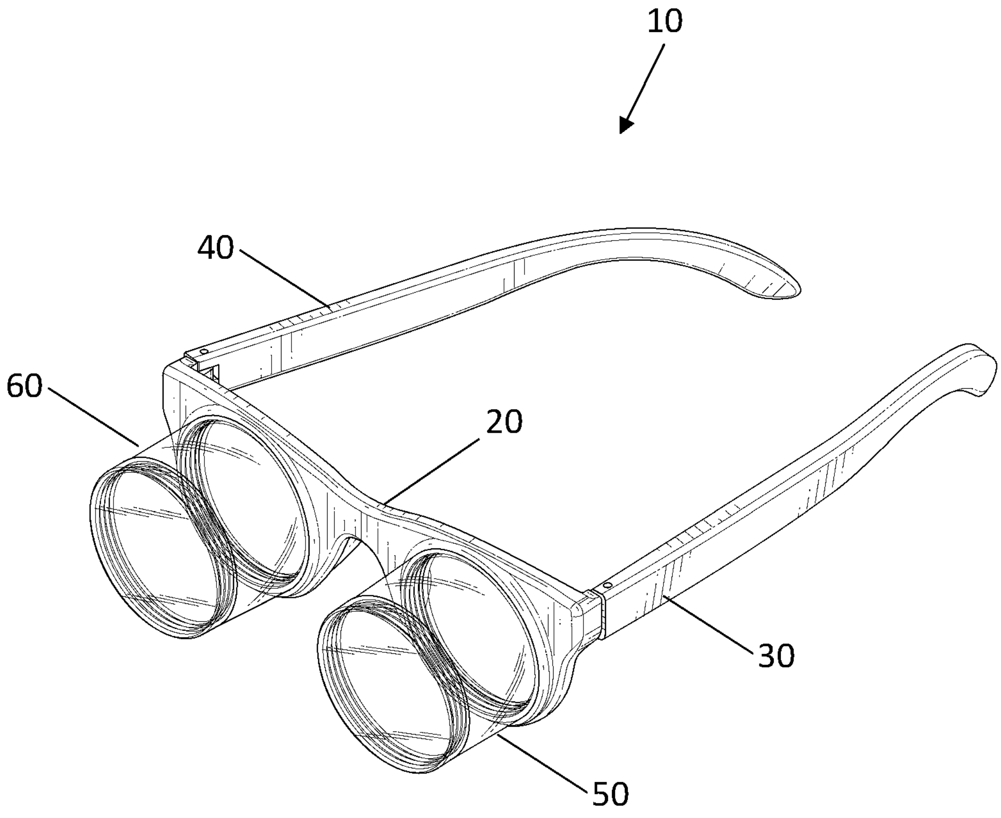
FIG. 1 shows a perspective view of a wearable drinking device in accordance with various embodiments of the present invention described herein.

FIG. 1 illustrates a wearable drinking device 10 according to various embodiments of the present invention. In the illustrated embodiment of FIG. 1, the wearable drinking device 10 may comprise a frame member 20, a first arm 30 secured to the frame member 20, a second arm 40 secured to the frame member 20, a first retaining member 50 configured to be secured to the frame member 20, and a second retaining member 60 configured to be secured to the frame member 20. In various embodiments, the first arm 30, the second arm 40, the first retaining member 50, and/or the second retaining member 60 may be fixedly secured to the frame member 20. In various embodiments, one or more of the first arm 30, the second arm 40, the first retaining member 50, and/or the second retaining member 60 may be configured to be detachably secured and/or selectively releasably coupled relative to the frame member 20. As shown in FIG. 1, the wearable drinking device 10 is configured for being worn on the face of a user (see e.g., FIG. 15 also). Additionally, the wearable drinking device 10 is configured for holding liquid and/or the like (e.g., for consumption) (see e.g., FIGS. 15-17).

Figure 2:
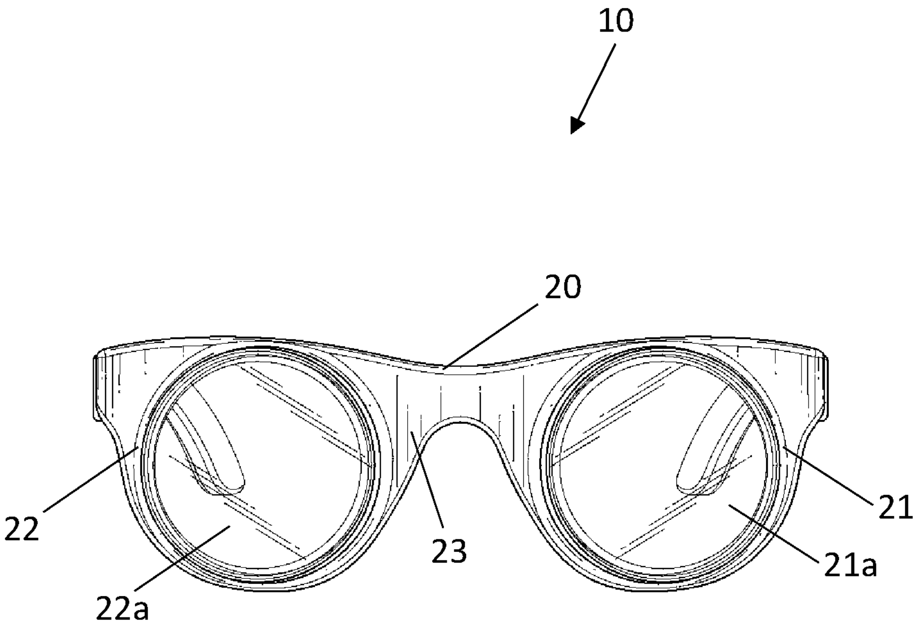
FIG. 2 shows a front view of a wearable drinking device in accordance with the various embodiments described herein.
Figure 3:
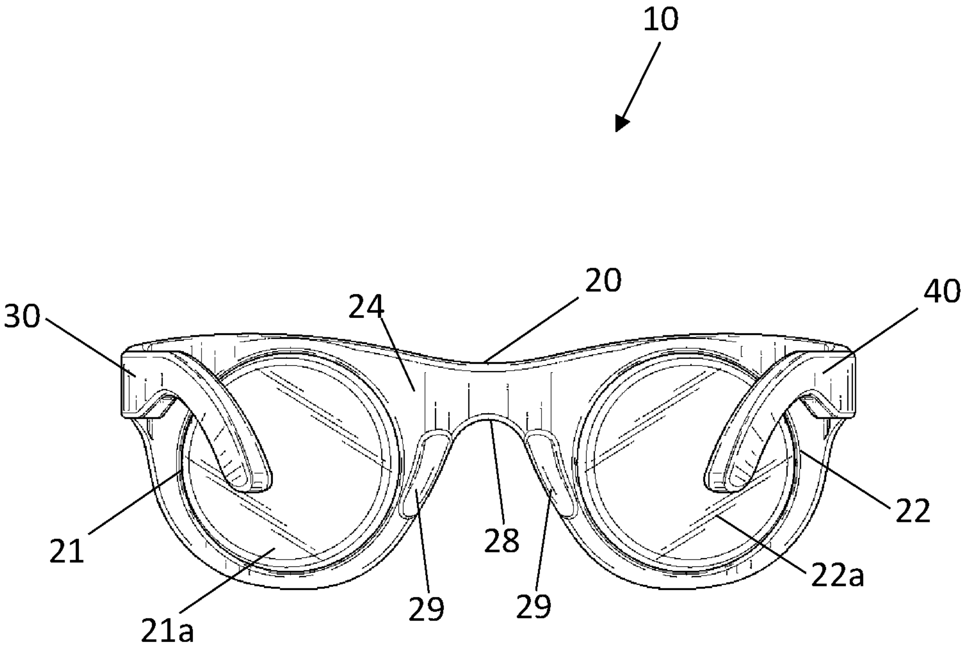
FIG. 3 shows a back view of a wearable drinking device in accordance with the various embodiments described herein.
Figure 4:
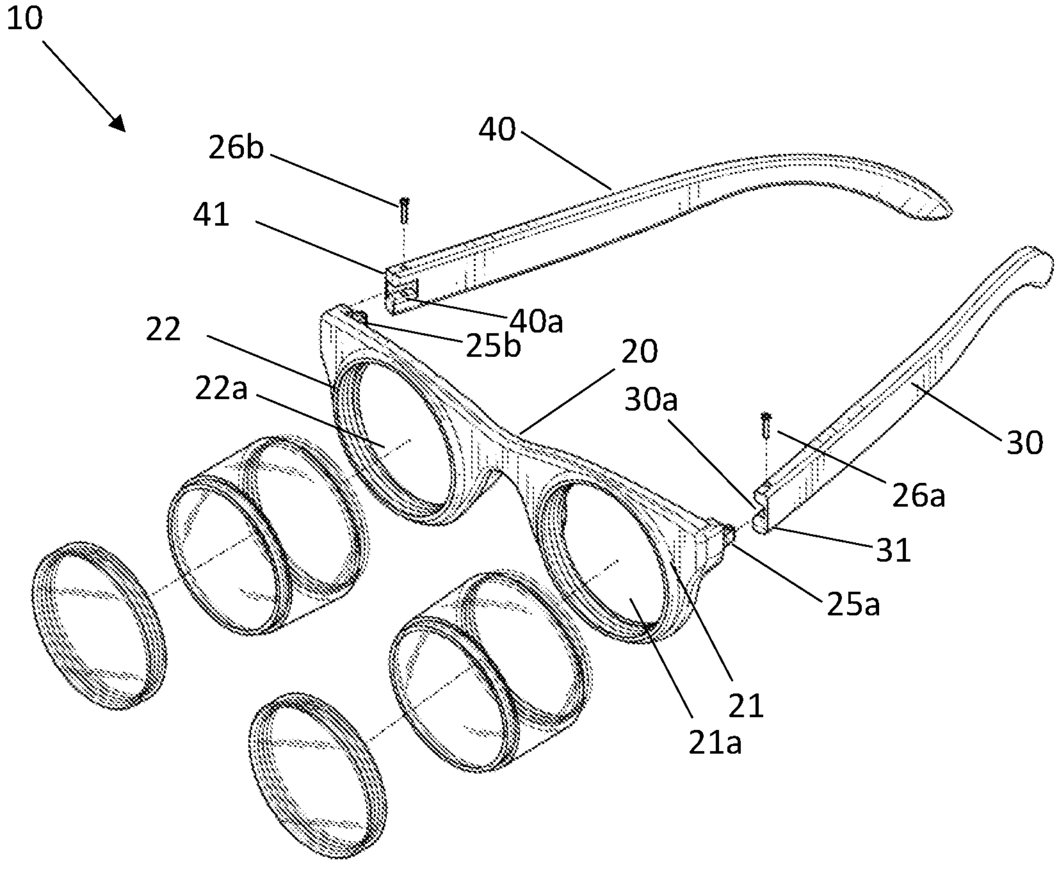
FIG. 4 shows an exploded perspective view of a wearable drinking device in accordance with the various embodiments described herein.

As shown in FIGS. 2-4, the frame member 20 may include an outer surface 23 and an inner surface 24. It should be understood that the frame member 20 may be made from a variety of materials. In some embodiments, the frame member may be made from a flexible material. In some embodiments, the frame member 20 may be made from a rigid material. In some embodiments, the frame member 20 may be made from a plastic material. In some embodiments, the frame member 20 may be made from a metal material. In some embodiments, the frame member 20 may be made from a composite material. In some embodiments, the frame member 20 may be made from a biodegradable material. In some embodiments, the frame member 20 may be coated. In some embodiments, the frame member 20 may be painted in one or more colors.

As depicted in FIG. 2, the frame member 20 may comprise a first frame portion 21 and a second frame portion 22. The first frame portion 21 may include an exterior perimeter and an interior perimeter, where the interior perimeter defines a first opening 21*a*. In various embodiments, the exterior perimeter of the first frame portion 21 may be substantially circular, substantially spherical, substantially square, substantially rectangular, substantially polygonal, and/or have a variety of other shapes (including irregular shapes). In various embodiments, the interior perimeter of the first frame portion 21 may be substantially circular, substantially spherical, substantially square, substantially rectangular, substantially polygonal, and/or have a variety of other shapes (including irregular shapes). In various embodiments, the shape of the interior perimeter of the first frame portion 21 may be approximately the same as the shape of the exterior perimeter of the first frame portion 21. In some embodiments, the shape of the interior perimeter of the first frame portion 21 may be different from the shape of the exterior perimeter of the first frame portion 21. For example, the shape of the exterior perimeter of the first frame portion 21 may be substantially polygonal and the shape of the interior perimeter of the first frame portion 21 may be substantially circular.

Still with reference to FIG. 2, The second frame portion 22 may include an exterior perimeter and an interior perimeter defining a second opening 22*a*. In various embodiments, the exterior perimeter of the second frame portion 22 may be substantially circular, substantially spherical, substantially square, substantially rectangular, substantially polygonal, and/or have a variety of other shapes (including irregular shapes). In various embodiments, the interior perimeter of the second frame portion 22 may be substantially circular, substantially spherical, substantially square, substantially rectangular, substantially polygonal, and/or have a variety of other shapes (including irregular shapes). In some embodiments, the shape of the interior perimeter of the second frame portion 22 may be approximately the same as the shape of the exterior perimeter of the second frame portion 22. In some embodiments, the shape of the interior perimeter of the second frame portion 22 may be different from the shape of the exterior perimeter of the second frame portion 22. For example, the shape of the exterior perimeter of the second frame portion 22 may be substantially polygonal and the shape of the interior perimeter of the second frame portion 22 may be substantially circular.

In various embodiments, the shape of the interior perimeter of the first frame portion 21 may be the same as the shape of the interior perimeter of the second frame portion 22. In various embodiments, the shape of the interior perimeter of the first frame portion 21 may be different from the shape of the interior perimeter of the second frame portion 22. In various embodiments, the shape of the exterior perimeter of the first frame portion 21 may be the same as the shape of the exterior perimeter of the second frame portion 22. In various embodiments, the shape of the exterior perimeter of the first frame portion 21 may be different from the shape of the exterior perimeter of the second frame portion 22.

As shown in FIG. 3, in various embodiments, the first frame portion 21 and the second frame portion 22 may be spaced apart relative to one another. In various embodiments the frame member 20 may include a bridge 28 between the first frame portion 21 and the second frame portion 22 and/or connecting the first frame portion 21 and the second frame portion 22. In some embodiments, each of the first frame portion 21 and the second frame portion 22 may include a nose pad 29 positioned on the frame portion 21 and the second frame portion 22 in a manner that when the frame member 20 is positioned on a user's face, each of the nose pads 29 rests on the user's nose.

Still with reference to FIG. 3, as noted, the wearable drinking device 10 may include a first arm 30 and a second arm 40. It should be understood that the first arm 30 and/or the second arm 40 may be made from a variety of materials. In some embodiments, the first arm 30 and/or the second arm 40 may be made from a flexible material. In some embodiments, the first arm 30 and/or the second arm 40 may be made from a rigid material. In some embodiments, the first arm 30 and/or the second arm 40 may be made from a plastic material. In some embodiments, the first arm 30 and/or the second arm 40 may be made from a metal material. In some embodiments, the first arm 30 and/or the second arm 40 may be made from a composite material. In some embodiments, the first arm 30 and/or the second arm 40 may be made from a biodegradable material. In some embodiments, the first arm 30 and/or the second arm 40 may be coated. In some embodiments, the first arm 30 and/or the second arm 40 may be painted in one or more colors.

As shown in FIG. 3, the first arm 30 and the second arm 40 may each be configured to be secured to the frame member 20. In various embodiments, the first arm 30 and/or the second arm 40 may be fixedly secured to the first frame member 20. In various embodiments, the first arm 30 and/or the second arm 40 may be configured to be detachably secured to the first frame member 20. As depicted in FIG. 3, the first arm 30 and the second arm 40 may be configured to be secured to opposing end portions of the frame member 20. In various embodiments, the first arm 30 and the second arm 40 may be configured to be secured to either opposing end portions of the frame member 20. For example, in some embodiments, the position of the first arm 30 and the second arm 40 relative to the frame member 20 may be interchangeable (e.g., by the user).

In various embodiments, each of the first arm 30 and the second arm 40 may be configured to be secured to the frame member 20 via one or more fastening members (e.g., hinges, screws, bolts, and/or the like). In various embodiments, the first arm 30 may be configured to be pivotably secured to the frame member 20 or otherwise secured to the frame member 20 in such a manner that permits selective rotation of the first arm 30 and the frame member 20. Additionally or alternatively, the second arm 40 may be configured to be pivotably secured to the frame member 20 or otherwise secured to the frame member 20 in such a manner that permits selective rotation of the second arm 40 and the frame member 20. In various embodiments, the first arm 30 and/or the second arm 40 may be configured to be pivotally secured to the frame member 20 utilizing hinges, screws, bolts, nuts, rods, the like, and or a combination thereof.

As illustrated in the embodiment of FIG. 4, a first protruding piece 25*a* may extend outwardly from the inner surface 24 of the frame member 20, where the first protruding piece 25*a* may define an opening therethrough for receiving a first fastening member 26*a* (e.g., a screw, a rod, a pin, and/or the like). A second protruding piece 25*b* may extend outwardly from the inner surface of the frame member 20, where the second protruding piece 25*b* may define an opening therethrough for receiving a second fastening member 26*b* (e.g., a screw, a rod, a pin, and/or the like). As shown in FIG. 4, in various embodiments, the first protruding piece 25*a* and the second protruding piece 25*b* may be positioned on opposing ends of the frame member 20. In some embodiments, the first protruding piece 25*a* extending outwardly from the frame member 20 and/or the second protruding piece 25*b* extending outwardly from the frame member 20 may be integrally formed. In some embodiments, the first protruding piece 25*a* extending outwardly from the frame member 20 and/or the second protruding piece 25*b* extending outwardly from the frame member 20 may be fixedly attached to the frame member 20. In some embodiments, the first protruding piece 25*a* extending outwardly from the frame member 20 and/or the second protruding piece 25*b* extending outwardly from the frame member 20 may be detachably attached to the frame member 20.

Still with reference to FIG. 4, The first arm 30 may define a first channel 30*a* on a first end 31 of the first arm 30 for receiving the first protruding piece 25*a*, where the first channel 30*a* may extend longitudinally along at least a portion of the first arm 30. Additionally, the first arm 30 may define an opening therethrough proximate to the channel 30*a*, where the opening extends generally vertically through a upper surface of the first arm 30 to a lower surface of the first arm 30, and is in communication with the first channel 30*a*. The opening defined by the first arm 30 may be configured to align with the opening of the first protruding piece 25*a* when the first protruding piece 25*a* is inserted into the first channel 30*a* and dimensioned to receive the first fastening member 26*a* to secure the first arm 30 to the frame member 20.

Still with reference to FIG. 4, similarly, the second arm 40 may define a second channel 40*a* on a first end 41 of the second arm 40 for receiving the second protruding piece 25*b*, where the second channel 40*a* may extend longitudinally along at least a portion of the second arm 40. Additionally, the second arm 40 may define an opening therethrough proximate to the channel 40*a*, where the opening extends generally vertically through a upper surface of the second arm 40 to a lower surface of the second arm 40, and is in communication with the second channel 40*a*. The opening defined by the second arm 40 may be configured to align with the opening of the second protruding piece 25*b* when the second protruding piece 25*b* is inserted into the second channel 40*a* and dimensioned to receive the second fastening member 26*b* to secure the second arm 40 to the frame member 20. It should be understood that each of the first arm 30 and the second arm 40 may be secured to the frame member 20 via a variety of fastening configurations. In various embodiments, the first arm 30 extending from the frame portion 20 may be integrally formed and/or the second arm 40 extending from the frame portion 20 may be integrally formed.

Figure 5:
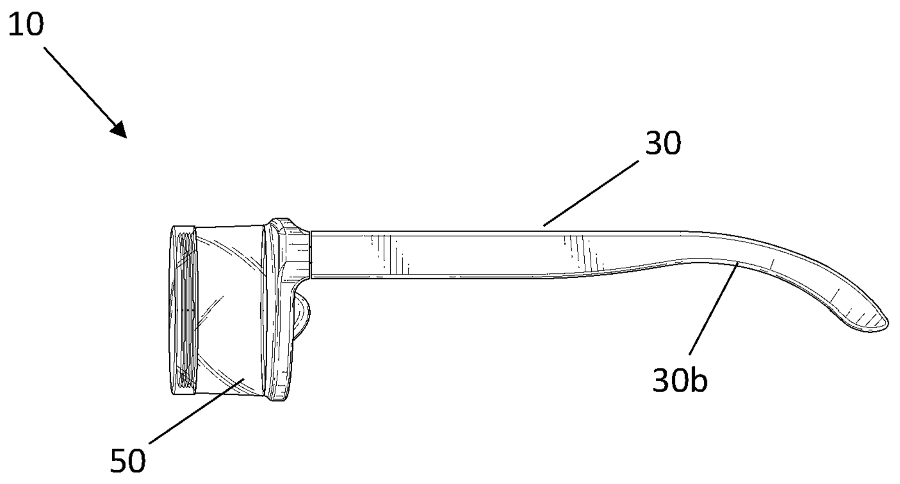
FIG. 5 shows a left view of a portion of a wearable drinking device in accordance with the various embodiments described herein.
Figure 6:
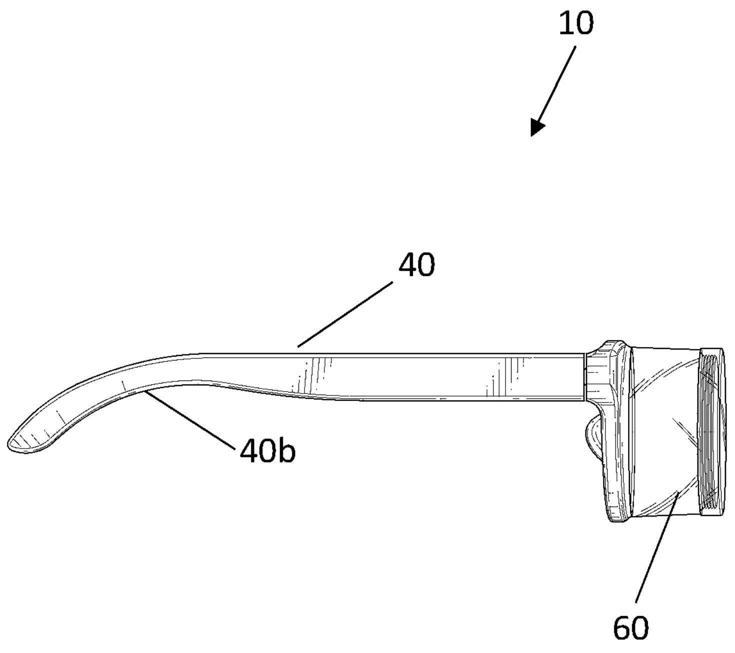
FIG. 6 shows a right view of a portion of a wearable drinking device in accordance with the various embodiments described herein.

With reference to FIGS. 5 and 6, in various embodiments, the first arm 30 and the second arm 40 may include a first curved portion 30*b* and a second curved portion 40*b* respectively, where the first curved portion 30*b* and the second curved portion 40*b* may each be configured for being positioned on a user's ears to support the wearable drinking device on the face of the user when worn. In various embodiments where the first arm 30 and the second arm 40 are pivotally secured to the frame member 20, the first arm 30 and the second arm 40 may be configured such that when the first arm 30 and the second arm 40 are folded towards the inner surface 24 of the frame member 20, each of the first arm 30 and the second arm 40 may be folded proximate to the inner surface 24 of the frame member 20. In various embodiments, the first arm 30 and the second arm 40 may be folded simultaneously.

Figure 7:
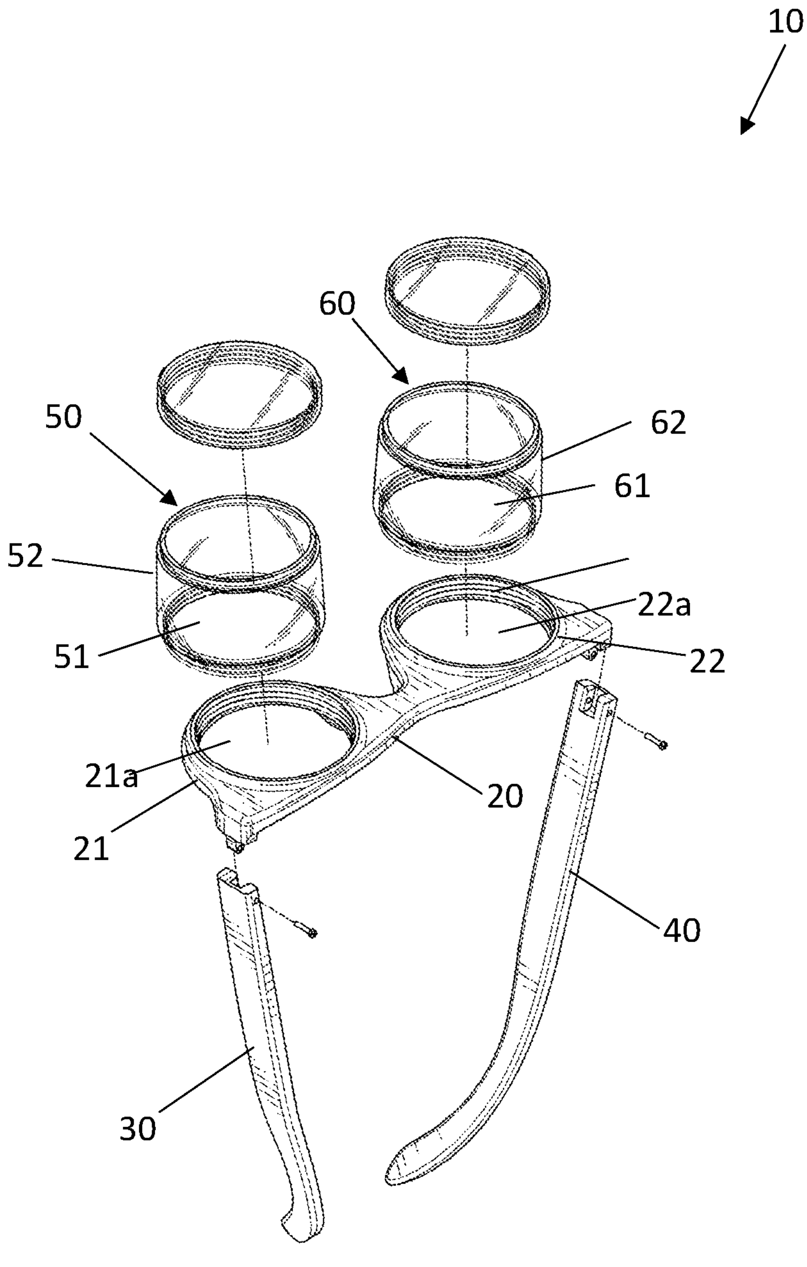
FIG. 7 shows an exploded top view of a wearable drinking device in accordance with the various embodiments described herein.

As noted, in various embodiments, the drinking device 10 includes at least one retaining member. In the illustrated embodiment of FIG. 7, the drinking device 10 may include a first retaining member 50 and a second retaining member 60. The first retaining member 50 may include a first bottom end 51 and a first hollow body 52 extending upwardly from the first bottom end 51, where the first bottom end 51 and the first hollow body 52 define an interior space. In various embodiments, the interior space may be dimensioned to hold a liquid substance and/or other substances. Similarly, the second retaining member 60 may include a second bottom end 61 and a second hollow body 62 extending upwardly from the second bottom end 61, where the second bottom end 61 and the second hollow body 62 define an interior space. In various embodiments, the interior space may be dimensioned to hold a liquid substance and/or other substances.

In various embodiments, the first bottom end 51 of the first retaining member 50 and/or the second bottom end 61 of the second retaining member 60 may be substantially circular, substantially spherical, substantially square, substantially rectangular, substantially polygonal, and/or have a variety of other shapes (including irregular shapes). In various embodiments, at least a portion of the first bottom end 51 may be substantially transparent and/or translucent such that a user may see through the first bottom end 51. Similarly, at least a portion of the second bottom end 61 may be substantially transparent and/or translucent such that a user may see through the second bottom end 61. In some embodiments, the first bottom end 51 and/or the second bottom end 61 may be made from glass material, plastic material, and/or other suitable materials.

In various embodiments, the first hollow body 52 and/or the second hollow body 62 may be substantially cylindrical, substantially conical, substantially rectangular, and/or have a variety of other shapes (including irregular shapes). In various embodiments, at least a portion of the first hollow body 52 and/or the second hollow body 62 may be substantially transparent and/or translucent. In some embodiments the first hollow body 52 and/or the second hollow body 62 may be made from glass material, plastic material, and or other suitable materials.

Figure 8:
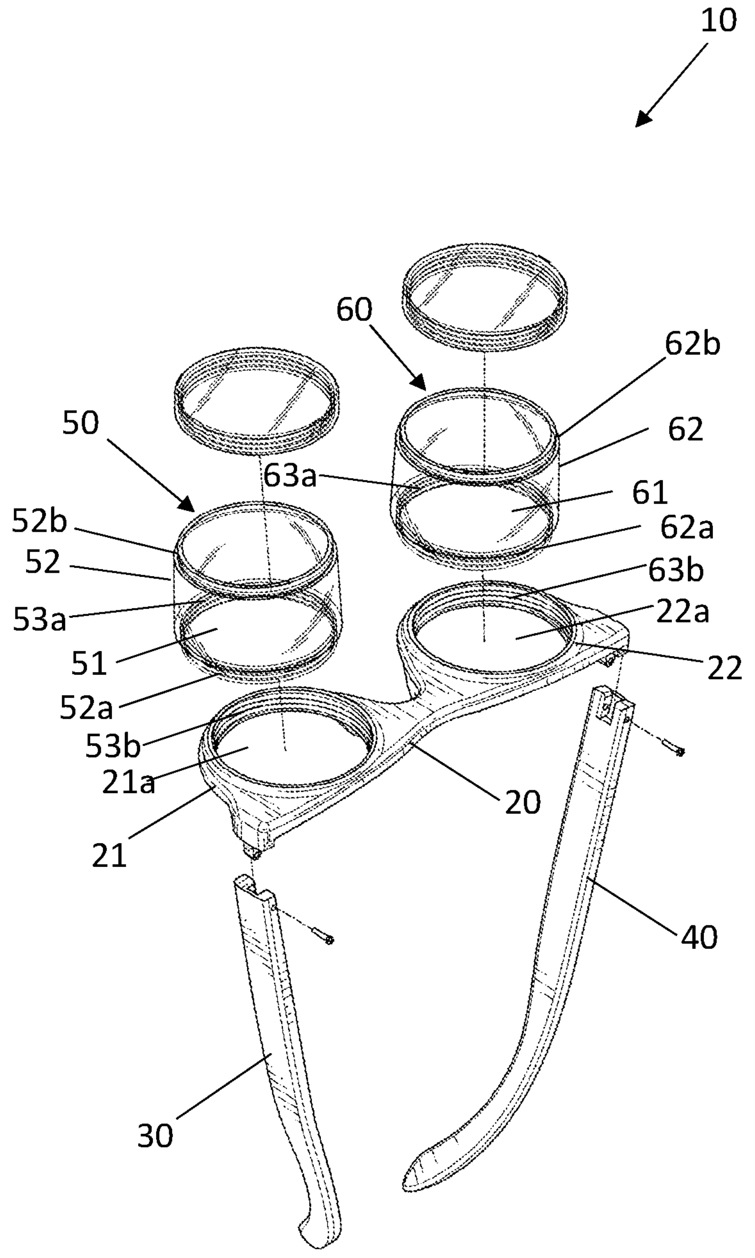
FIG. 8 shows an exploded top view of a wearable drinking device in accordance with the various embodiments described herein.

As shown in FIG. 8, the first hollow body 52 may include a first lower portion 52*a* and a first upper portion 52*b*. In various embodiments when the first retaining member 50 is secured to the first frame portion 21 of the frame member 20, at least a portion of the first lower portion 52*a* extends into the first opening 21*a* of the first frame portion 21. The first lower portion 52*a* of the first retaining member 50 may include a fastening member to secure the first retaining member 50 to the first frame portion 21 of the frame member 20. Still with reference to FIG. 8, the first lower portion 52*a* may include a first male thread 53*a* extending along at least a portion of an exterior perimeter of the first lower portion 52*a* and configured to mate with a first female thread 53*b* extending along at least a portion of the interior perimeter of the first frame portion 21.

Similarly, as shown in FIG. 8, the second hollow body 62 may include a second lower portion 62*a* and a second upper portion 62*b*. In various embodiments when the second retaining member 60 is secured to the second frame portion 22 of the frame member 20, at least a portion of the second lower portion 62*a* extends into the second opening 22*a* of the second frame portion 22. The second lower portion 62*a* of the second retaining member 60 may include a fastening member to secure the second retaining member 60 to the second frame portion 22 of the frame member 20. Still with reference to FIG. 8, the second lower portion 62*a* may include a second male thread 63*a* extending along at least a portion of an exterior perimeter of the second lower portion

62*a* and configured to mate with a second female thread 63*b* extending along at least a portion of the interior perimeter of the second frame portion 22.

Figure 9:
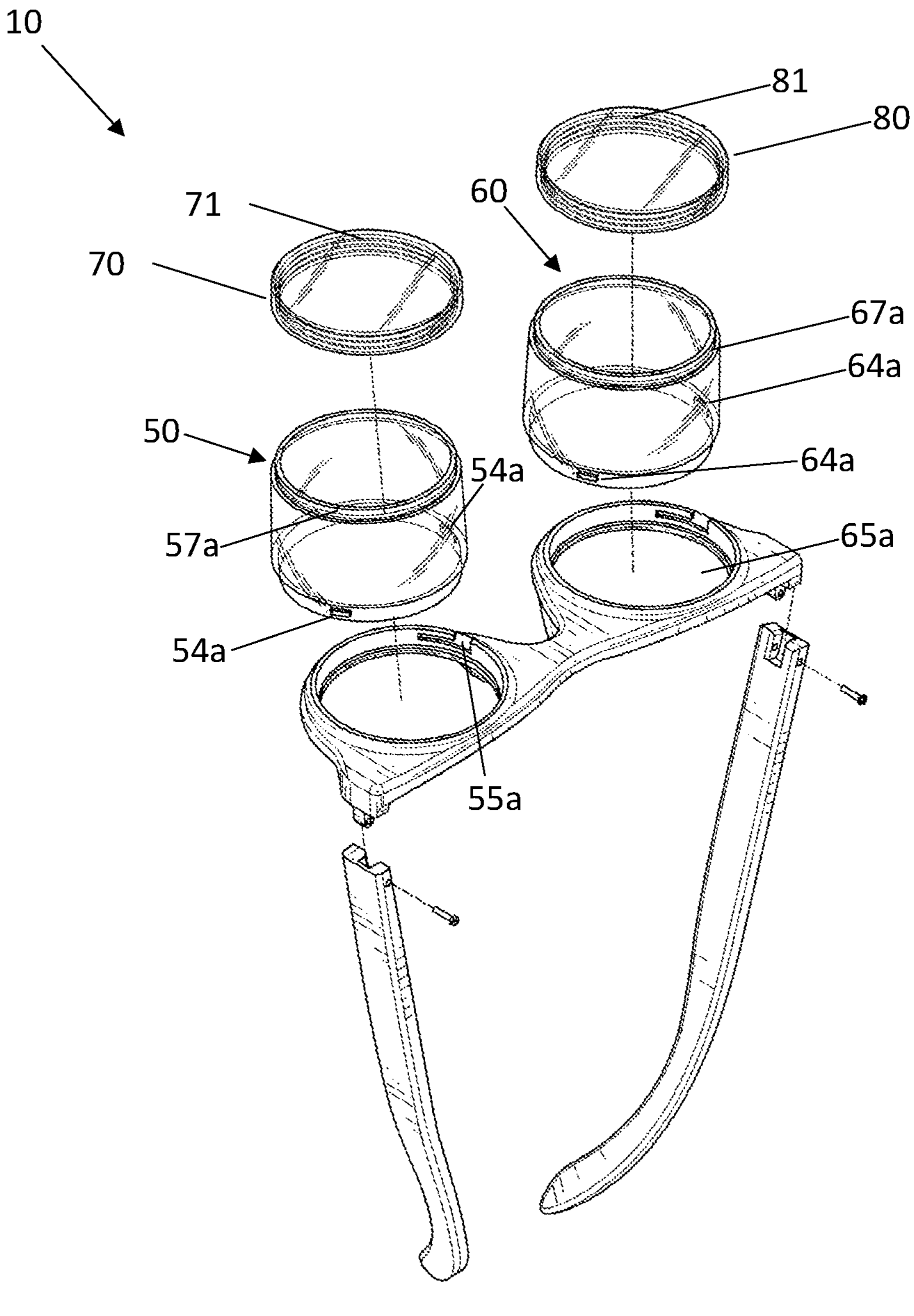
FIG. 9 shows an exploded top view of a wearable drinking device in accordance with the various embodiments described herein.

FIG. 9 shows an alternative fastening configuration for securing the first retaining member 50 and/or the second retaining member 60 to the frame member 20. As shown in FIG. 9, the first lower portion 52*a* of the first retaining member 50 may include one or more first connectors 54*a* projecting outwardly from the exterior perimeter of the first lower portion 52*a* of the first hollow body 52 of the first retaining member 50. The interior perimeter of the first frame portion 21 may define one or more first slots 55*a* extending at least a portion of therein configured to receive the one or more first connectors 54, where the one or more slots 55*a* is dimensioned to detachably secure the one or more first connectors 54*a*. Similarly, the second lower portion of 62*a* of the second retaining member 60 may include one or more second connectors 64*a* projecting outwardly from the exterior perimeter of the second lower portion 62*a* of the second hollow body 62 of the second retaining member 60. The interior perimeter of the second frame portion 22 may define one or more second slots 65*a* extending at least portion therein configured to receive the one or more connectors 64*a*, where the one or more slots 65*a* is dimensioned to detachably secure the one or more connectors 64*a*.

In some embodiments, the first retaining member 50 and/or the second retaining member 60 is secured to the frame portion 20 via a friction type fit. For example, in some embodiments, an insert and an O-Ring may be utilized for securing the first retaining member 50 and/or the second retaining member 60 to the frame portion 20 (see e.g., FIGS. 11-12 and discussion thereof elsewhere herein). It should be understood that each of the first retaining member 50 and the second retaining member 60 may be secured to the frame member 20 via a variety of fastening configurations. So secured, various components may be selectively removable, releasable, and/or connectable to the frame member 20, as desired for various applications (see discussion elsewhere herein of methods of use of embodiments).

In various embodiments, the first retaining member 50 and the second retaining member 60 may each be configured for being secured to either of the first frame portion 21 or the second frame portion 22. For example, in some embodiments, the first retaining member 50 and the second retainer member 60 may be configured to be interchangeable (see e.g., FIGS. 9-12).

Still with reference to FIG. 9, In some embodiments, the wearable drinking device 10 may include a first cap 70 configured to be releasably secured to the first retaining member 50 and/or a second cap 80 configured to be releasably secured to the second retaining member 60. In some embodiments, the first cap 70 may be configured for being secured to the first retaining member 50 and/or the second cap 80 may be configured for being secured to the second retaining member 60 using a friction type fit (e.g., an insert, an O-ring, and/or the like) (see e.g., FIGS. 11-12 and discussion thereof elsewhere herein). In some embodiments, at least a portion of the first cap 70 may extend into the interior space of first retaining member 50 when the first cap 70 is secured to first retaining member 50 and/or at least a portion of the second cap 80 may extend into the interior space of the second retaining member 60 when the second cap 80 is secured to the second retaining member 60.

In some embodiments, the first cap 70 may be configured for being secured to the first retaining member 50 using a threaded connection and/or the second cap 80 may be configured for being secured to the second retaining member 60 using a threaded connection. For example, as shown in FIG. 9, in some embodiments, the first cap 70 may include a third female thread 71 extending along at least a portion of an interior perimeter of the first cap 70 configured to mate with a third male thread 57*a* extending along at least a portion of an exterior perimeter of the first upper portion 52*b*. Similarly, as shown in FIG. 9, the second cap 80 may include a fourth female thread 81 extending along at least a portion of an interior perimeter of the second cap 80 configured to mate with a fourth male thread 67*a* extending along at least a portion of an exterior perimeter of the second upper portion 62*b*.

Figure 10:
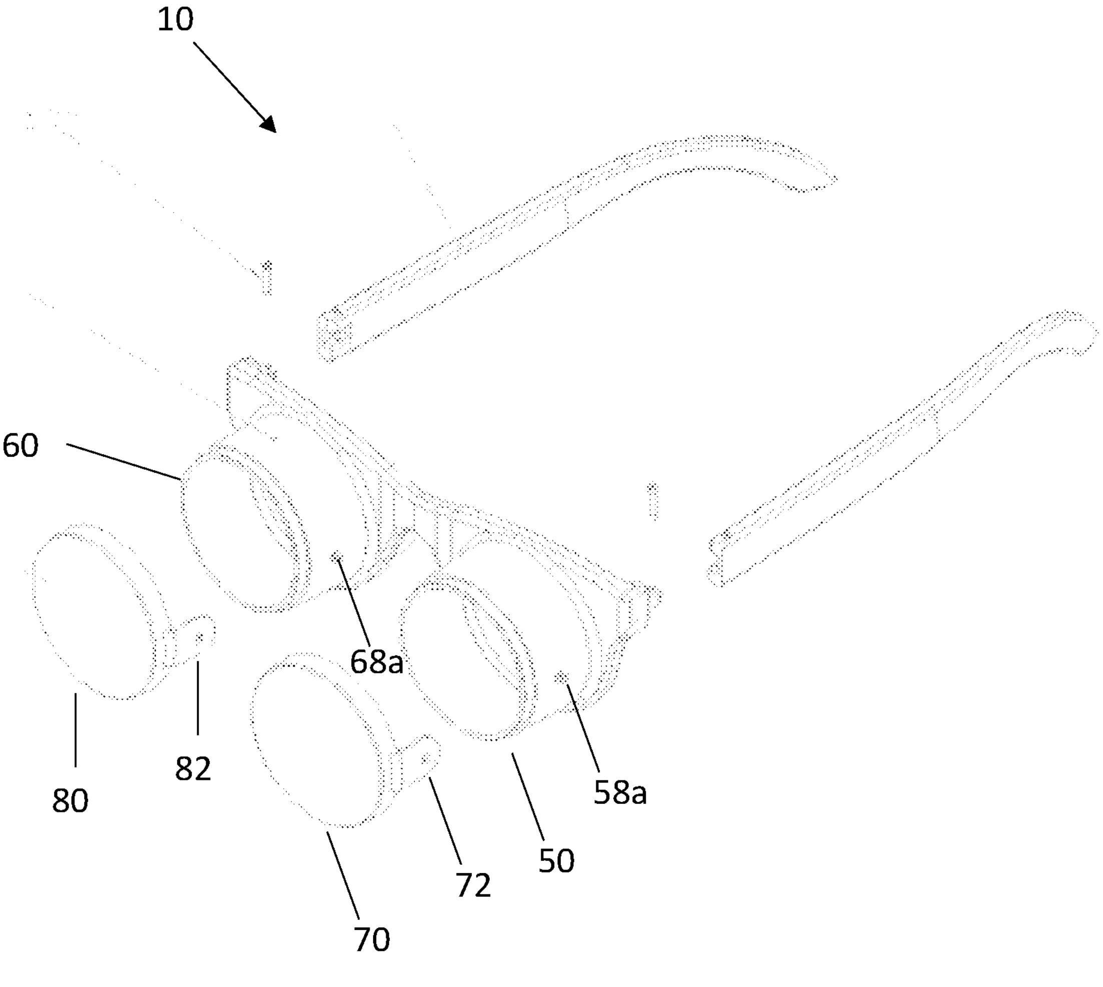
FIG. 10 shows a perspective view of a wearable drinking device in accordance with the various embodiments described herein.

FIG. 10 shows an alternative fastening configuration for securing the first cap 70 to the first retaining member 50 and/or securing the second cap 80 to the second retaining member 60. As shown in FIG. 10, the first cap 70 may include one or more first tabs 72 extending from an exterior perimeter of the first cap 70. Each tab of the one or more first tabs 72 may define an opening therethrough for receiving a corresponding projecting piece of one or more first projecting pieces 58*a* extending from an exterior perimeter of the first hollow body 52. As shown in FIG. 10, the one or more first projecting pieces 58*a* may be dimensioned for being inserted into the opening defined by the one or more first tabs 72. In some embodiments, the one or more first projecting pieces 58*a* may each include a lip extending from a top edge of the one or more projecting pieces 58*a* configured for detachably securing the first cap 70 to the first retaining member 50.

Still with reference to FIG. 10, the second cap 80 may include one or more second tabs 82 extending from an exterior of the second cap 80. Each tab of the one or more second tabs 82 may define an opening therethrough for receiving a corresponding projecting piece of one or more second projecting pieces 68*a* extending from an exterior perimeter of the second hollow body 62. As shown in FIG. 10, the one or more second projecting pieces 68*a* may be dimensioned for being inserted into the opening defined by the one or more second tabs 82. In some embodiments, the one or more second projecting pieces 68*a* may each include a lip extending from a top edge of the one or more projecting pieces 68*a* configured for detachably securing the second cap 80 to the second retaining member 60. It should be understood that each of the first cap 70 and the second cap 80 may be detachably secured to the first retaining member 50 and the second retaining member 60 respectively via a variety of fastening configurations. In some embodiments, the first cap 70 and the second cap 80 may each be configured for being secured to either the first retaining member 50 or second retaining member 60. For example, in some embodiments, the first cap 70 and second cap 80 may be interchangeable.

Figure 11:
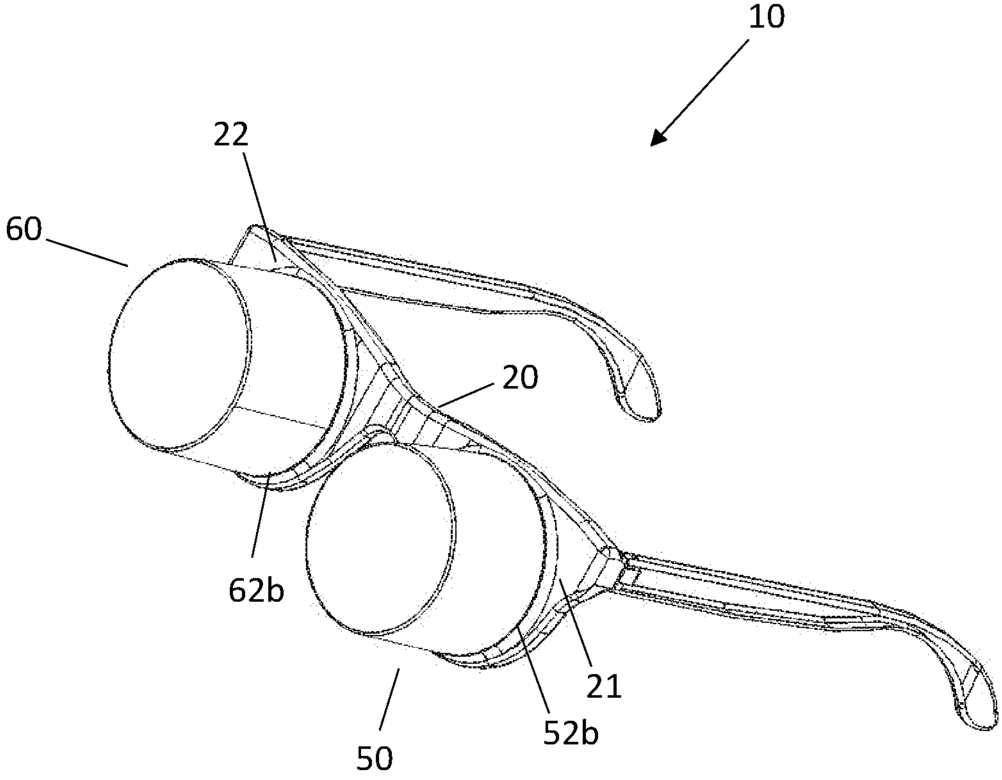
FIG. 11 shows a perspective view of a wearable drinking device in accordance with certain embodiments described herein.

In various embodiments, as shown by way of non-limiting example in FIG. 11, the first retaining member 50 may be configured for being secured to the frame member 20 with the first upper portion 52*b* proximate the frame member 20. For example, the orientation of the first retaining member 50 when secured to the first frame portion 21 of the frame member 20 may be such that the first upper portion 52*b* faces the outer surface 23 of the frame member 20. In some embodiments, the first cap 70 is secured to the first upper portion 52*b*. In some embodiments, the first cap 70 is not secured to the first upper portion 52*b*.

Figure 12:
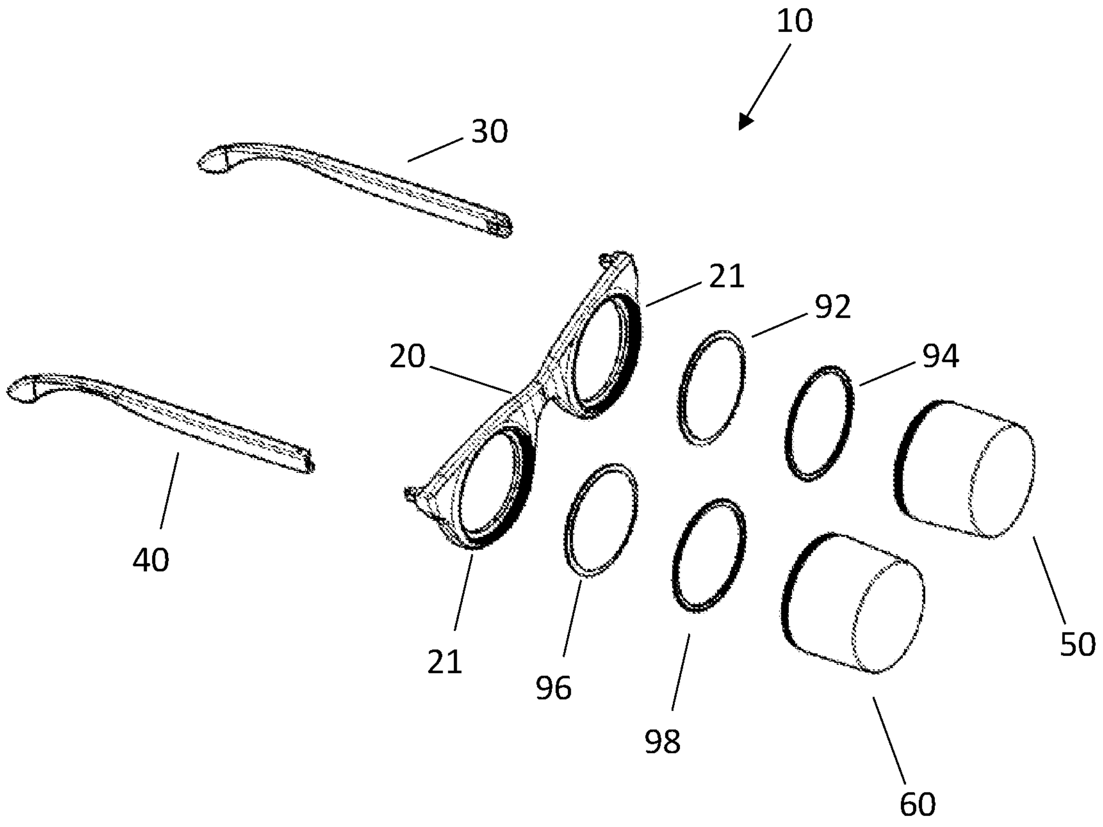
FIG. 12 shows an exploded perspective view of a wearable drinking device in accordance with certain embodiments described herein.

In various embodiments, the first retaining member 50 may be secured to the first frame portion 21 via a friction-type fit. As a non-limiting example, as shown in FIG. 12, in some embodiments, the first retaining member 50 may be secured to the first frame portion 21 using a first insert 92 and a first O-Ring 94. In some embodiments, the first retaining member 50 may be secured to the first frame portion 21 via a threaded connection or other fastening configurations.

Similarly, as shown by way of non-limiting example in FIG. 11, the second retaining member 60 may be configured for being secured to the frame member 20 with the second upper portion 62*b* proximate to the frame member 20. For example, the orientation of the second retaining member 60 when secured to the second frame portion 22 of the frame member 20 may be such that the second upper portion 62*b* faces the outer surface 23 of the frame member 20. In some embodiments, the second cap 80 is secured to the second upper portion 62*b*. In some embodiments, the second cap 80 is not secured to the second upper portion 62*b*.

In various embodiments, the second retaining member 60 may be secured to the second frame portion 22 via a friction type fit. As a non-limiting example, as shown in FIG. 12, in some embodiments, the second retaining member 60 may be secured to the second frame portion 22 using a second insert 96 and a second O-Ring 98. In some embodiments, the second retaining member 60 may be secured to the second frame portion 22 via a threaded connection or other fastening configurations.

As noted, the retainer member 50 and/or retainer member 60 may be substantially transparent and/or translucent. It should be understood that the retainer member 50 may have differing degrees of opacity and the retainer member 60 may have differing degrees of opacity. In some embodiments, the retainer member 50 and/or the retainer member 60 may have a portion that is etched, patterned, and/or the like configured in a manner that visibility is not impeded. In some embodiments, the retainer member 50 and/or the retainer member 60 may include one or more decals or the like positioned in a manner that visibility is not impeded.

II. EXEMPLARY METHODS OF USING THE WEARABLE DRINKING DEVICE 10

Figure 13:
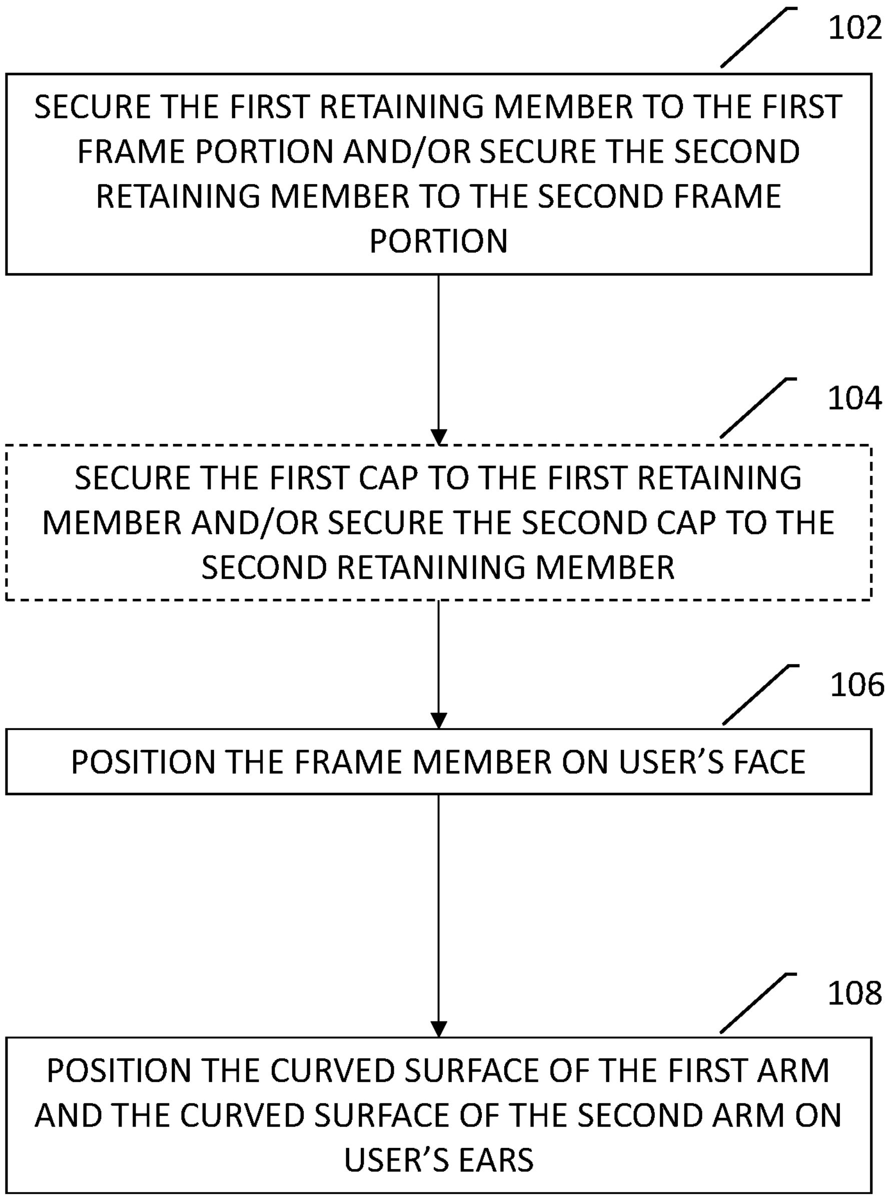
FIG. 13 is a flow chart illustrating a method of use of the wearable drinking device in accordance with the various embodiments described herein.

FIG. 13 provides a flowchart illustrating a method of use of the wearable drinking device 10, in accordance with example embodiments of the present invention. Starting at block 102, the first retaining member 50 may be secured to the first frame portion 21 of the frame member 20 and/or the second retaining member 60 may be secured to the second frame portion 22 of the frame member 20. For example, the first retaining member 50 may be secured to the first frame portion 21 by inserting the first lower portion 52*a* of the first retaining member 50 into the first opening 21*a* of the first frame portion 21. The first retaining member may be rotated to detachably secure the first retaining member 50 to the frame member 20.

Continuing with FIG. 13, at block 104, the first cap 70 may optionally be secured to the first retaining member 50 and/or the second cap 80 may be optionally secured to the second retaining member 60. For example, the first upper portion 52*b* of the first retaining member 50 may be inserted into the interior perimeter of the first cap 70. In some embodiments, the first retaining member 50 and the first cap 70 may then be rotated relative to each other to secure the first cap 70 to the first retaining member 50. In some embodiments, the one or more first tabs of the first cap 70 may be engaged with the one or more first projecting pieces of the first hollow body 52 of the first retaining member 50 to detachably secure the first cap 70 to the first retaining member 50.

At block 106, the frame member 20 may be positioned on a user's face, where the inner surface 24 of the frame member is positioned in a direction facing the user, and the first frame portion 21 and the second frame portion 22 are positioned in front of the user's left eye and right eye respectively. In various embodiments, a portion of the first frame portion and a portion of the second frame portion rests on the user's nose.

At block 108, the first curved portion 30*b* of the first arm 30 may be positioned on the user's left ear and the second curved portion 40*b* of the second arm 40 may be positioned on the user's right ear to further support the frame member positioned on the user's face.

Figure 14:
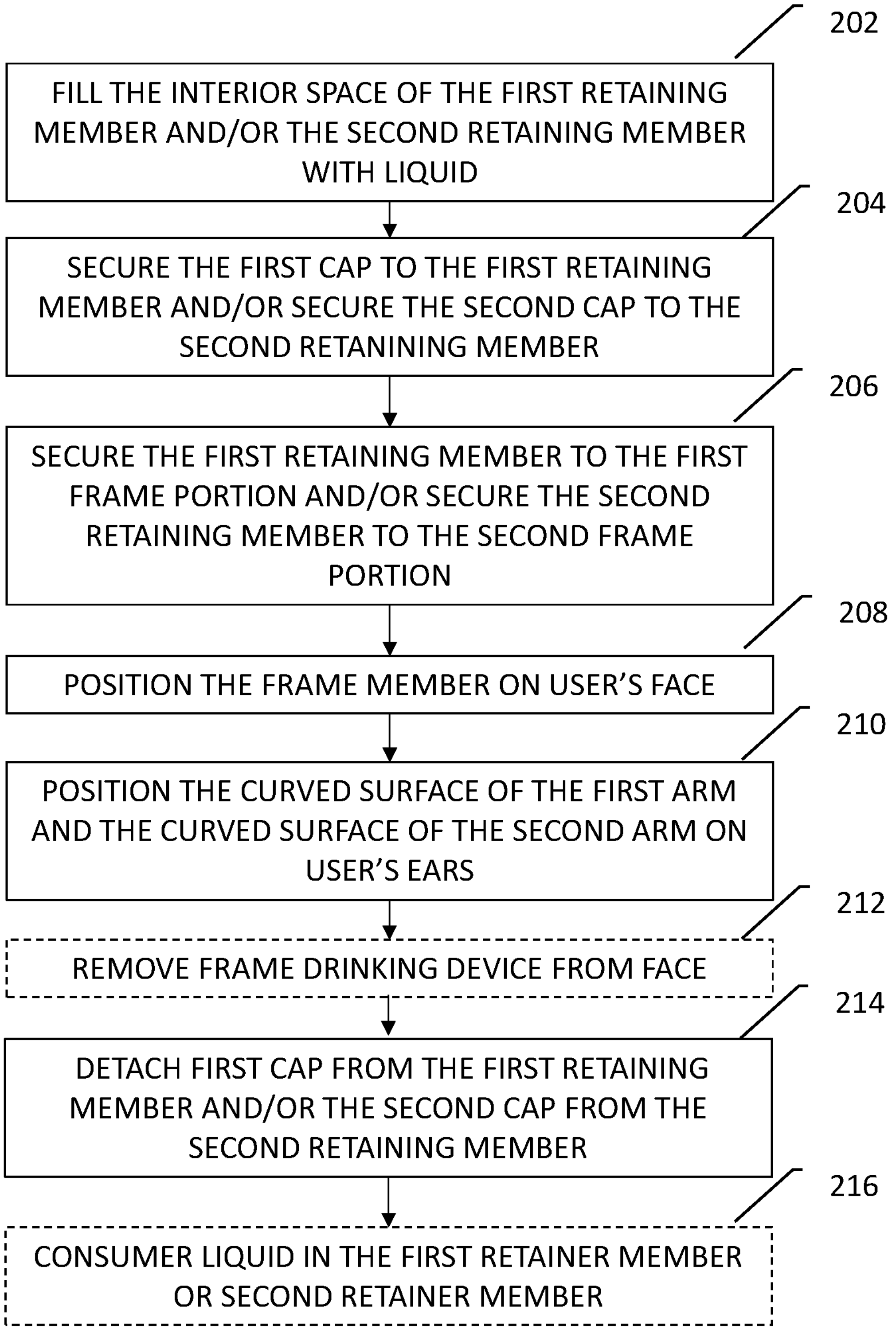
FIG. 14 is a flow chart illustrating another method of use of the wearable drinking device in accordance with the various embodiments described herein.

FIG. 14 provides a flowchart illustrating another method of use of the wearable drinking device 10, in accordance with example embodiments of the present invention. Starting at block 202, the interior space of the first retaining member 50 and/or the interior space of the second retaining member 60 may be filled (e.g., partial or full) with liquid. For example, the first retaining member 50 and/or the second retaining member 60 may be filled with water. As another example, the first retaining member 50 and/or the second retaining member 60 may be filled with alcohol.

At block 204, the first cap 70 may be secured to the first retaining member 50 and/or the second cap 80 may be secured to the second retaining member 60. For example, the first upper portion 52*b* of the first retaining member 50 may be inserted into the interior perimeter of the first cap 70. In some embodiments, the first retaining member 50 and the first cap 70 may then be rotated relative to each other to secure the first cap 70 to the first retaining member 50. In some embodiments, the one or more first tabs of the first cap 70 may be engaged with the one or more first projecting pieces of the first hollow body 52 of the first retaining member 50 to detachably secure the first cap 70 to the first retaining member 50.

At block 206, the first retaining member 50 may be secured to the first frame portion 21 of the frame member 20 and/or the second retaining member 60 may be secured to the second frame portion 22 of the frame member 20. For example, the first retaining member 50 may be secured to the first frame portion 21 by inserting the first lower portion 52*a* of the first retaining member 50 into the first opening 21*a* of the first frame portion 21. The first retaining member may be rotated to detachably secure the first retaining member 50 to the frame member 20.

Figure 15:
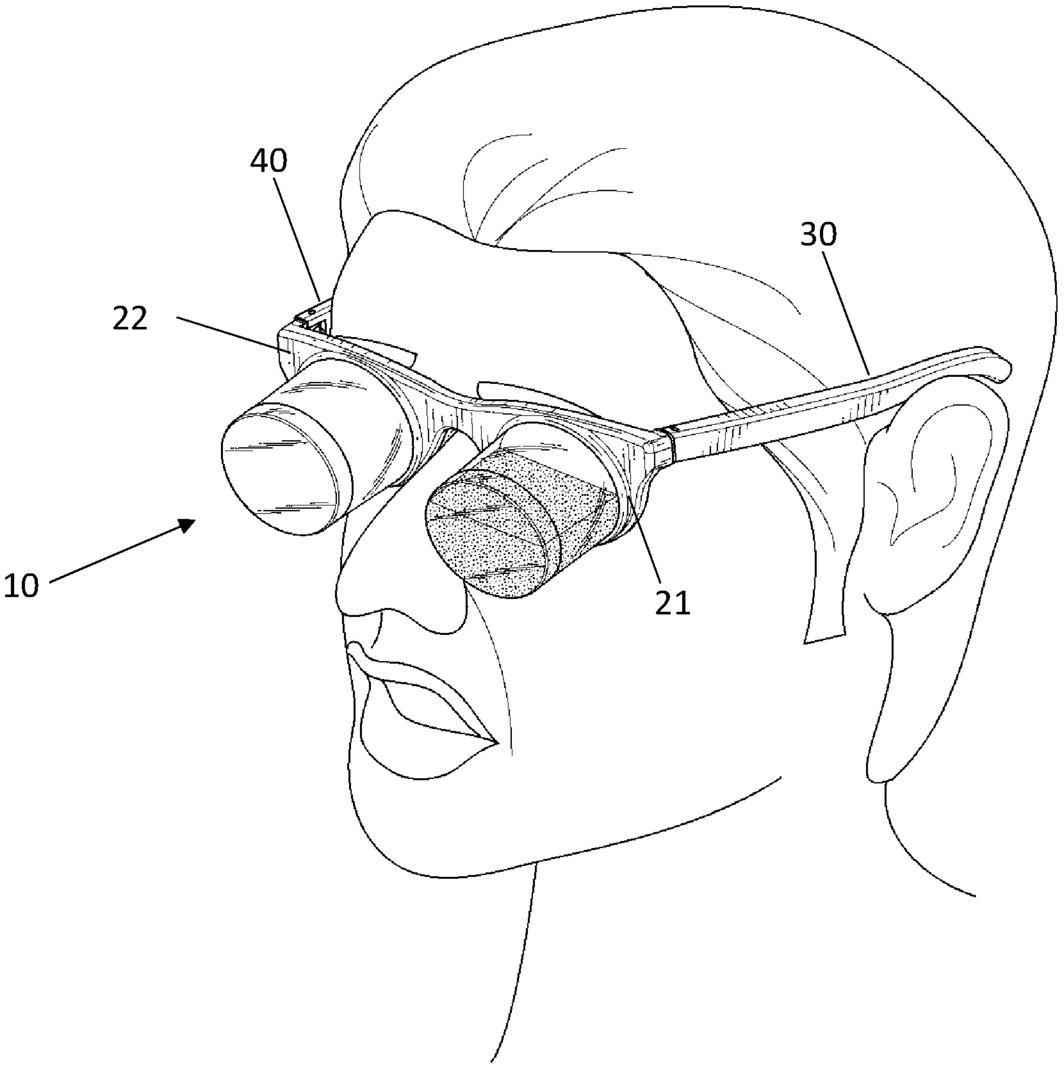
FIG. 15 shows an illustration of a user wearing the drinking device in accordance with the various embodiments described herein.

At block 208, the frame member 20 may be positioned on a user's face, where the inner surface 24 of the frame member is positioned in a direction facing the user, and the first frame portion 21 and the second frame portion 22 are positioned in front of the user's left eye and right eye respectively (see FIG. 15). In various embodiments, a portion of the first frame portion and a portion of the second frame portion rests on the user's nose.

At block 210, the first curved portion 30*b* of the first arm 30 may be positioned on the user's left ear and the second curved portion 40*b* of the second arm 40 may be positioned on the user's right ear to further support the frame member positioned on the user's face (see FIG. 15).

Figure 16:
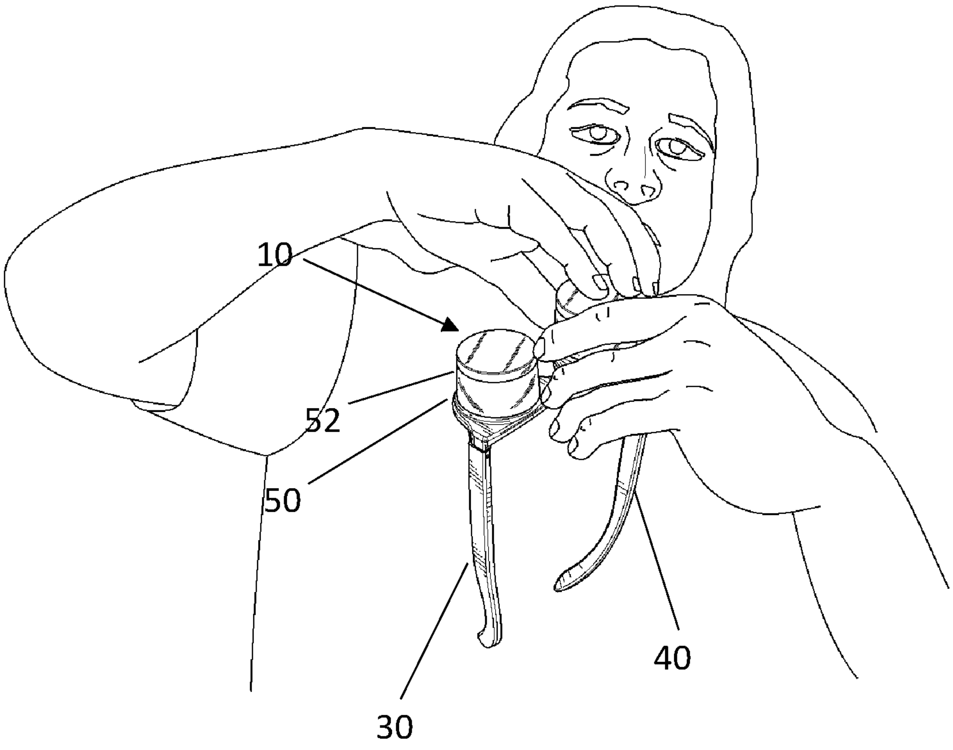
FIG. 16 shows another illustration of a user making use of the wearable drinking device in accordance with the various embodiments described herein.
Figure 17:
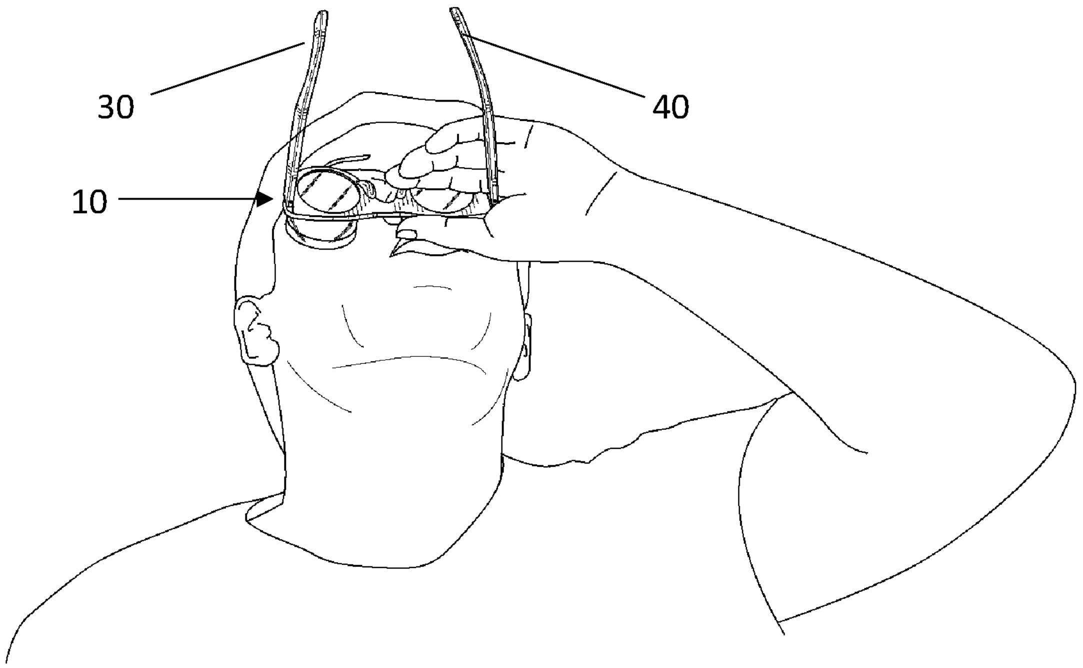
FIG. 17 shows another illustration of a user making use of the wearable drinking device in accordance with the various embodiments described herein.

At block 212, the wearable drinking device 10 may optionally be removed from the user's face and positioned with the first upper portion 52 of the first retaining member 50 and the second upper portion 62*b* of the second retaining member 60 substantially facing up (see FIG. 16).

At block 214, the first cap 70 may be detached from the first retaining member 50 and/or the second cap 80 may be detached from the second retaining member 60. At block 216, the liquid (e.g., water, alcohol, and/or the like) in the first retaining member 50 and/or the liquid in the second retaining member 60 may be consumed or otherwise disposed (see FIGS. 16 and 17).

III. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A wearable drinking device comprising:

at least one retaining member configured for holding a liquid, the at least one retaining member comprising:

a bottom end; and a hollow body extending from the bottom end and having an upper portion and a lower portion, wherein the bottom end and the hollow body define an interior space, and wherein the hollow body comprises one or more non-threaded projecting members extending outwardly from an exterior perimeter of the hollow body;

at least one cap configured to be detachably secured to the upper portion of the hollow body of the at least one retaining member via the one or more non-threaded projecting members of the hollow body;

a frame member, wherein the frame member comprises:

a first frame portion defining a first opening; and a second frame portion defining a second opening; wherein the at least one retaining member is configured for being secured to at least one of: (i) the first frame portion or (ii) the second frame portion;

a first arm secured to the first frame portion; and a second arm secured to the second frame portion.

2. The wearable drinking device of claim 1, wherein at least a portion of the at least one retaining member is substantially transparent.

3. The wearable drinking device of claim 1, wherein at least a portion of the at least one cap is substantially transparent.

4. The wearable drinking device of claim 1, wherein the at least one retaining member is substantially cylindrical.

5. The wearable drinking device of claim 1, wherein the at least one retaining member is substantially conical.

6. The wearable drinking device of claim 1, wherein at least one of the first arm or the second arm comprises a curved portion.

7. The wearable drinking device of claim 1, wherein the at least one retaining member is fixedly secured to at least one of the first frame portion or the second frame portion.

8. The wearable drinking device of claim 1, wherein the at least one retaining member is detachably secured to at least one of the first frame portion or the second frame portion.

9. The wearable drinking device of claim 1, wherein the first frame portion and the second frame portion are spaced apart relative to one another.

10. The wearable drinking device of claim 1, wherein the at least one retaining member is made from a glass material.

11. The wearable drinking device of claim 1, wherein the at least one retaining member is made from a plastic material.

12. The wearable drinking device of claim 1, wherein the lower portion of the hollow body is proximate to the frame member when the at least one retaining member is secured to at least one of the first frame portion or the second frame portion.

13. The wearable drinking device of claim 1, wherein the upper portion of the hollow body is proximate to the frame member when the at least one retaining member is secured to at least one of the first frame portion or the second frame portion.

14. The wearable drinking device of claim 1, wherein the at least one retaining member is secured to at least one of the first frame portion or the second frame portion utilizing a friction-type fit.

15. The wearable drinking device of claim 1, wherein the lower portion of the hollow body of the at least one retaining member comprises:

a thread extending along at least a portion of an exterior perimeter of the lower portion configured for mating with a corresponding thread extending along an interior perimeter of at least one of the first opening of the first frame portion or the second opening of the second frame portion.

16. The wearable drinking device of claim 1, wherein the lower portion of the hollow body of the at least one retaining member comprises:

one or more connecting pieces extending from an exterior perimeter of the lower portion of the hollow body configured for securing the at least one retaining member to at least one of the first frame portion or the second frame portion.

17. The wearable drinking device of claim 16, wherein an interior perimeter of the first opening defined by the first frame portion comprises:

one or more slots configured for receiving the one or more connecting pieces extending from the exterior perimeter of the lower portion of the hollow body.

18. A wearable drinking device comprising:

at least one retaining member comprising:

a bottom end; and a hollow body extending from the bottom end and having an upper portion and a lower portion, wherein the bottom end and the hollow body define an interior space;

a frame member, wherein the frame member comprises:

a first frame portion defining a first opening;

an insert;

an O-ring; and a second frame portion defining a second opening; wherein the at least one retaining member is configured for being secured via the insert and the O-ring to at least one of: (i) the first frame portion or (ii) the second frame portion;

a first arm secured to the first frame portion; and a second arm secured to the second frame portion.

19. A method for using a wearable drinking device, the method comprising the steps of:

providing a wearable drinking device comprising:

at least one retaining member comprising a bottom end; and a hollow body extending from the bottom end and having an upper portion and a lower portion, wherein the bottom end and the hollow body define an interior space;

at least one cap configured to be detachably secured to the upper portion of the hollow body of the at least one retaining member;

a frame member comprising a first frame portion defining a first opening and a second frame portion defining a second opening;

wherein the at least one retaining member is configured for being secured to at least one of: (i) the first frame portion or (ii) the second frame portion;

filling the interior space of the at least one retaining member with a liquid;

securing the at least one cap to the at least one retaining member;

securing the lower portion of the at least one retaining member to the frame member; and positioning the frame member on a user's face.

* * * * *